(12) United States Patent
Schaefer, Jr.

(10) Patent No.: US 7,507,131 B2
(45) Date of Patent: Mar. 24, 2009

(54) FUEL TANK WITH TRASH AND WATER SEPARATION/CONTAINMENT DEVICE

(76) Inventor: Louis E. Schaefer, Jr., 105 Nellies La., Broussard, LA (US) 70518

( * ) Notice: Subject to any disclaimer, the term of this patent is extended or adjusted under 35 U.S.C. 154(b) by 308 days.

(21) Appl. No.: 11/282,736

(22) Filed: Nov. 17, 2005

(65) Prior Publication Data
US 2007/0207685 A1     Sep. 6, 2007

Related U.S. Application Data

(60) Provisional application No. 60/629,181, filed on Nov. 18, 2004.

(51) Int. Cl.
*F01N 7/00* (2006.01)
(52) U.S. Cl. ....................................... 440/88 F
(58) Field of Classification Search ................. 440/88 F
See application file for complete search history.

(56) References Cited

U.S. PATENT DOCUMENTS

| | | | |
|---|---|---|---|
| 1,518,686 A | 12/1924 | Bland | |
| 2,339,303 A | 1/1944 | Tillery | |
| 2,703,607 A | 3/1955 | Simmonds | |
| 2,896,657 A | 7/1959 | Uhll et al. | |
| 3,804,291 A | 4/1974 | Fricker | |
| 3,924,773 A | 12/1975 | Wilkinson | |
| 4,107,052 A | 8/1978 | Yoshino et al. | |
| 4,799,504 A | 1/1989 | Scragg et al. | |
| 5,287,717 A | 2/1994 | Lancaster | |
| 5,503,199 A * | 4/1996 | Whitley et al. | ............... 141/312 |
| 5,518,017 A | 5/1996 | Snook, Jr. | |

* cited by examiner

*Primary Examiner*—Stephen Avila
(74) *Attorney, Agent, or Firm*—Garvey, Smith, Nehrbass & North, L.L.C.; Seth M. Nehrbass; Charles C. Garvey, Jr.

(57) ABSTRACT

A fuel tank apparatus is particularly suited for use on vehicles and marine vessels. A fuel tank can be used to supply fuel to an engine, compressor or the like such as when the tank is used to operate an engine or air compressor. The apparatus includes a tank body having a plurality of tank outer walls surrounding an interior that enables fuel to be contained. The tank body has upper and lower end portions. Flow lines are provided for adding fuel to the tank interior and for discharging fuel that is to be consumed by an engine, compressor or other device. The lower end portion of the tank body provides a sump that is specially configured to trap the undesirable contents of fuel such as trash, water, debris, settleable solids and the like. The interior includes a baffle structure that is space inwardly of the tank body providing a vent flow passage that extends from a position just above the sump to a position next to the upper end portion of the body. In this fashion, the sump traps settleable material while the vent flow passage allows air to bubble upwardly and not discharge through the fuel discharge flow line.

9 Claims, 8 Drawing Sheets

FUEL TANK WITH TRASH AND WATER SEPARATION/CONTAINMENT DEVICE

CROSS-REFERENCE TO RELATED APPLICATIONS

Priority of U.S. Provisional Patent Application Ser. No. 60/629,181, filed 18 Nov. 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fuel tanks. More particularly, the present invention relates to fuel tanks used on military vehicles, land vehicles, marine vessels and other moving vehicles or devices which have attitude changes, wherein an improved tank arrangement enhances the separation of solid matter and air from contained fuel.

2. General Background of the Invention

The following fuel tank related U.S. Patents are incorporated herein by reference: U.S. Pat. Nos. 1,518,686; 2,339,303; 2,896,657; 3,804,291; 3,924,773; 4,107,052; 4,799,504; 5,287,717.

U.S. Pat. No. 4,107,052 discloses a fuel tank with a separator system having a slanted bottom and a sump at the bottom for separation of oil and water.

U.S. Pat. No. 3,924,773 discloses a fuel tank with multiple vents.

U.S. Pat. Nos. 2,339,303 and 1,518,686 disclose fuel tanks with a sump at the bottom of the tank with a drain plug.

U.S. Pat. Nos. 3,804,291 and 4,799,504 disclose fuel tanks with drain plugs for separation of water and other pollutants.

BRIEF SUMMARY OF THE INVENTION

The present invention relates to a fuel tank apparatus for use on military vehicles, land vehicles, marine vessels and vehicles and other devices which have attitude changes.

The tank of the present invention has a tank body with a plurality of tank outer walls that surround an interior for containing fuel. The tank body has upper and lower end portions and can be comprised of a plurality of side walls and end walls.

A tank filler flow line can be provided for filling the fuel tank. A discharge flow line enables fuel to be transmitted from the tank interior to a selected location such as an engine, compressor or other device that consumes fuel. The lower end portion of the tank body provides a sump that is specially configured to trap water and debris.

The interior can contain baffle structure, e.g. a plurality of interior walls that define with the exterior walls one or more vent flow passages that extend from a position next to the sump to a position next to the upper end portion of the tank body. During use, this passage area allows air bubbles to vent to the upper end portion of the fuel tank at a position spaced away from the fuel discharge flow line.

A sump area is placed at the bottom of the tank body. Air is vented from the contained fuel via vents or vent pipes. The sump includes a sloped trash collector at the sump lower end portion.

Any trash or water in the fuel sinks to the bottom, entering the sump area. These portions then slide into the sloped trash collector, and can be removed via a drain plug or plugs. Wash out plugs allow pressure washing of the inside of the trash collector.

As a marine vessel lists to port and then to starboard, the tank also lists back and forth. Fuel is thus mixed in the tank. Any contained trash and water likewise mix with the fuel. Vents allow the air to move upwardly so that the air does not get compressed and mixed back into the fuel. Similar motion is generated by a truck that travels a not so smooth road.

The sloped interior walls of the tank allow the bottom of the fuel supply pipe always to be in fuel (as long as too much water does not accumulate in the sump area), as when the tank is tilted. Water and trash are trapped and contained below the sloped interior wall.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The present invention provides a fuel tank 10 that can be used with a vehicle (e.g. truck, automobile, marine vessel) or part of a vehicle or marine vessel. For example, fuel tank 10 can be used on the deck of a work boat to power a compressor for use by divers or on the bed of a work truck. As used herein, the term vehicle means any mobile device that imparts motion during use to fuel tank 10 such as but not limited to marine vessel, truck, trailer, automobile, tank, armored car, personnel carrier, or other device that imparts the same or similar motion to a vessel on open seas or a truck riding on a road.

Figure 1:
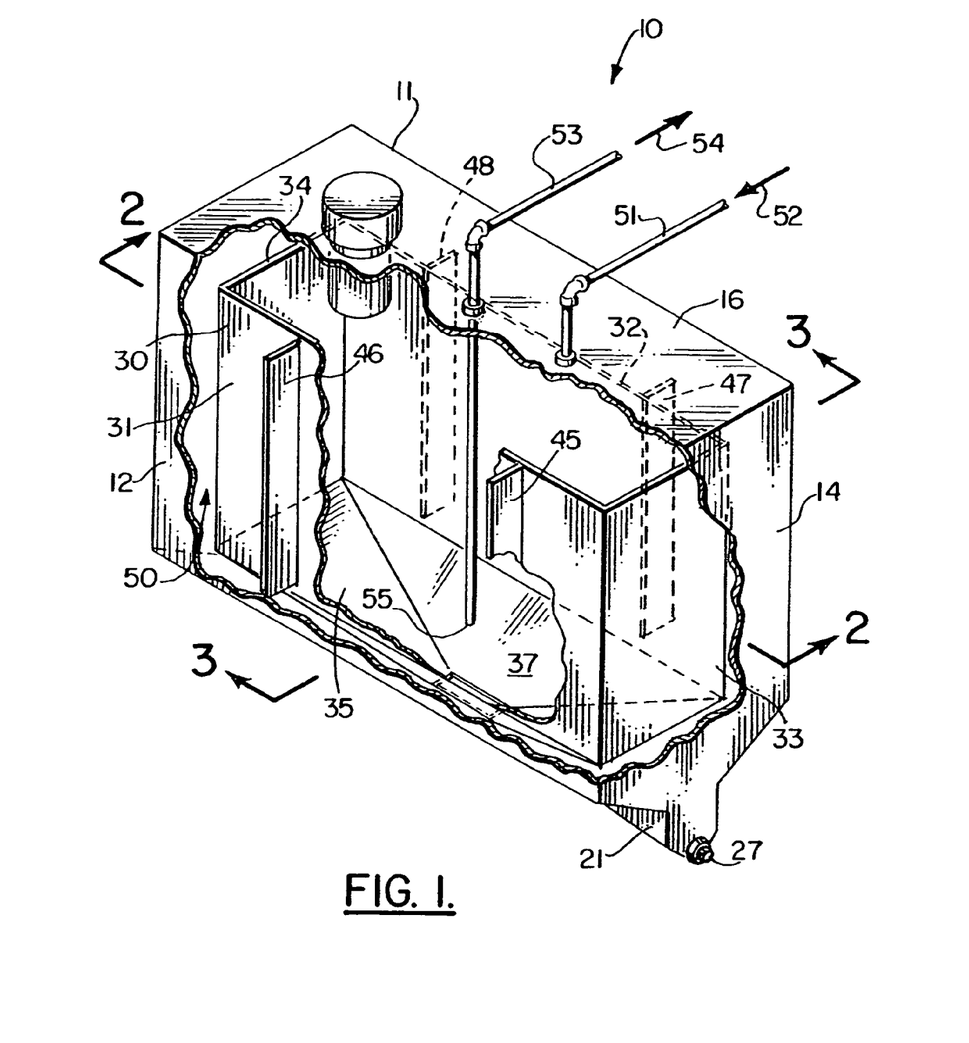
FIG. 1 is a perspective view of the preferred embodiment of the apparatus of the present invention.
Figure 3:
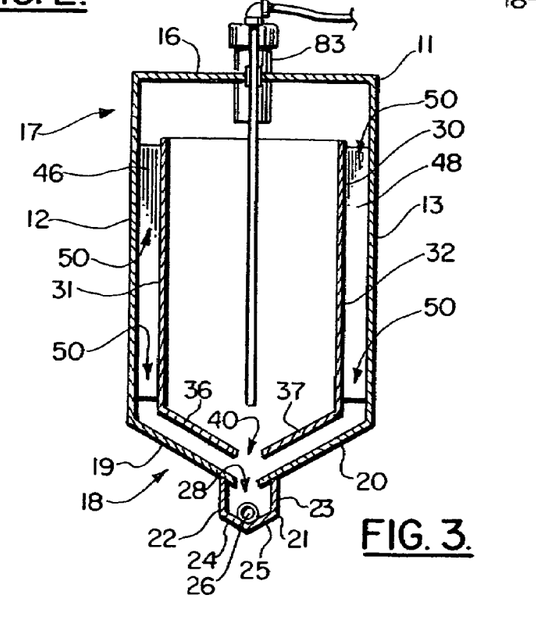
FIG. 3 is an end view of the preferred embodiment of the apparatus of the present invention taken along lines 3-3 of FIG. 1.

Fuel tank 10 can also be used to provide fuel to a vessel's engine. Fuel tank 10 includes a tank body 11 that can be comprised of a pair of opposed side walls 12, 13 each of which can be vertically oriented. Tank body 11 can also include end walls 14, 15 that can be vertically oriented. A cover or top wall panel 16 is provided. The tank body thus provides an upper end portion 17 and a lower end portion 18. The lower end portion 18 provides a sump 21 that is fitted to the bottom of inclined side walls 19, 20 as shown in FIG. 3. The tank body 11 can be of welded steel construction for example, with each of the walls 12, 13, 14, 15, 19, 20 being steel or other weldable metallic walls that are connected together in a configuration shown in the drawings using welding. Fuel lines 51, 53 can be provided. The flow line 51 can be used to add fuel to tank 11 interior 49 or to vent tank 11, as indicated by arrow 52. Flow line 53 can be used to supply fuel to a machine or to vent tank 11 when being filled via flow line 51, as indicated by arrow 54 in FIG. 1.

Figure 2:
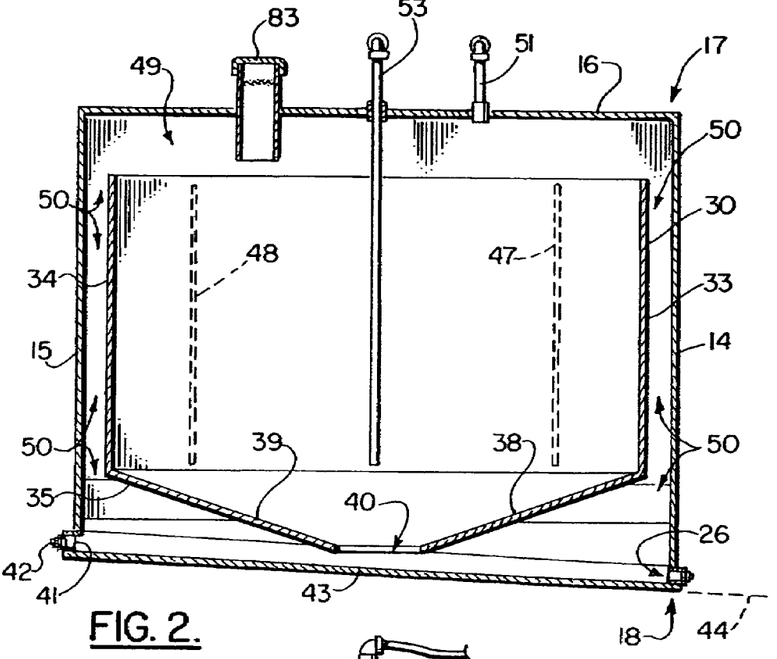
FIG. 2 is a sectional view of the preferred embodiment of the apparatus of the present invention taken along lines 2-2 of FIG. 1.
Figure 6:
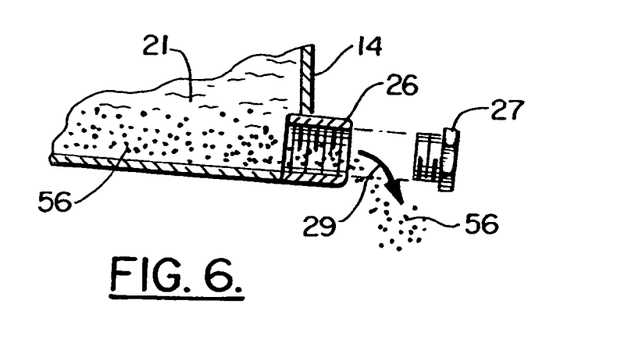
FIG. 6 is a fragmentary view of the preferred embodiment of the apparatus of the present invention.

Sump 21 can be comprised of a pair or opposed wall sections 22, 23 that are preferably vertically oriented and a pair of wall sections 24, 25 that are preferably inclined. In the side view of FIG. 2, the sump 21 is inclined, providing an inclined trough 43 tracking a reference line 44. This reference line 44 can form an angle of between about 0 and 45, preferably between about 10-20 degrees with horizontal. As shown in FIGS. 2, 3 and 6, the sump has a drain opening 26 that can be closed with plug 27. A gap 28 is defined by the lower end portions of the inclined side walls 19, 20 as shown in FIG. 3. Because the sump 21 is inclined, water, particulate matter, debris or other material that is an undesirable content of fuel is collected in sump 21 and can be discharged via drain opening 26 as indicated by arrow 29 in FIG. 6.

Tank body 11 provides an interior 49. A baffle structure 30 is supported within interior 49 in a position that spaces the baffle structure inwardly of side walls 12, 13 and end walls 14, 15 as shown in FIGS. 1, 2, 3, 4 and 5. The baffle structure 30 can be comprised of side walls 31, 32, end walls 33, 34, and a lower funnel 35. The funnel 35 can be constructed of welded inclined plates 36, 37, 38, 39 as shown in FIGS. 1-5. A funnel opening 40 is provided at the lowest portion of funnel 35 as shown in FIGS. 2 and 3. An debris, particulate matter, undesirable liquids such as water falls via gravity to funnel 35 and passes through funnel opening 40 into sump 20. This undesirable debris is then trapped in a large peripheral channel 50 that is in between baffle structure 30 and tank body 11. The baffle structure 30 is supported in this spaced apart relation with tank body 11 using for example, a plurality of vertical beams 45, 46, 47, 48.

Figure 4:
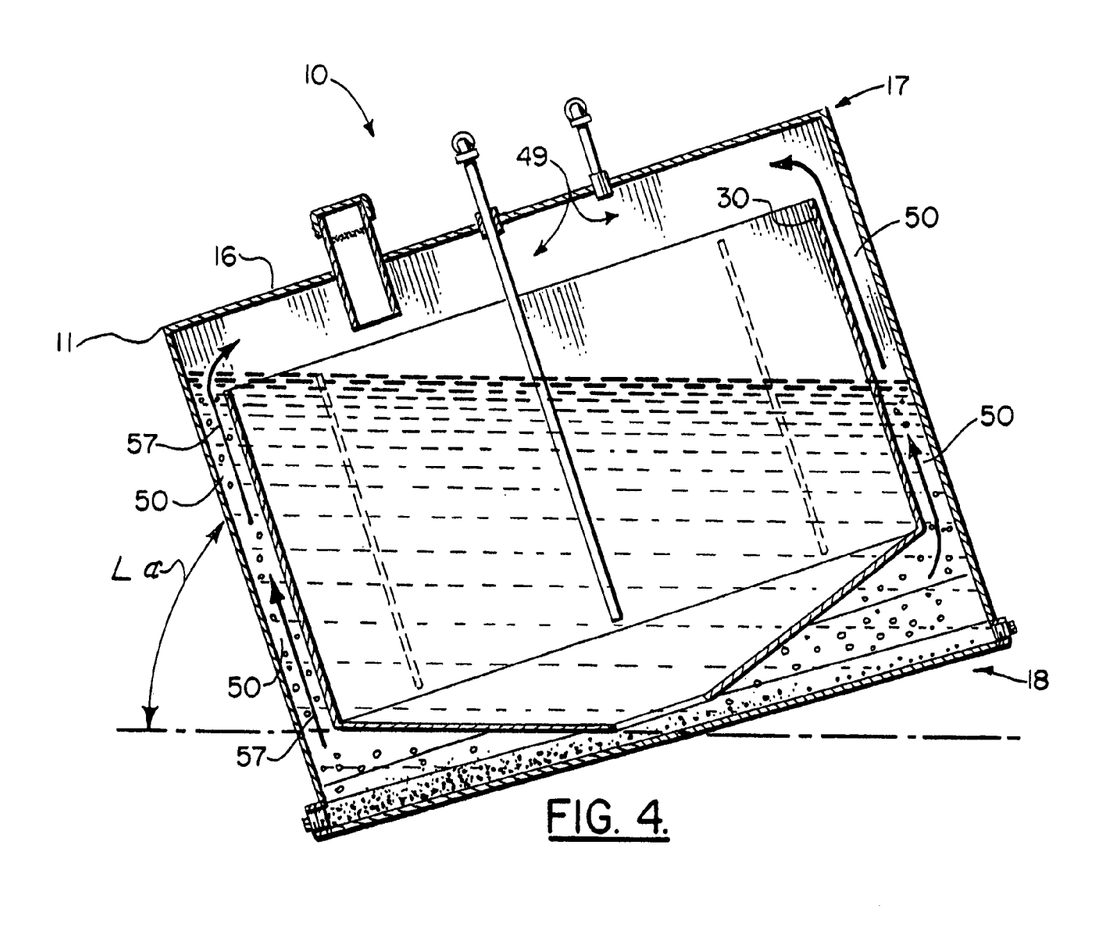
FIG. 4 is a side elevational view of the preferred embodiment of the apparatus of the present invention.
Figure 5:
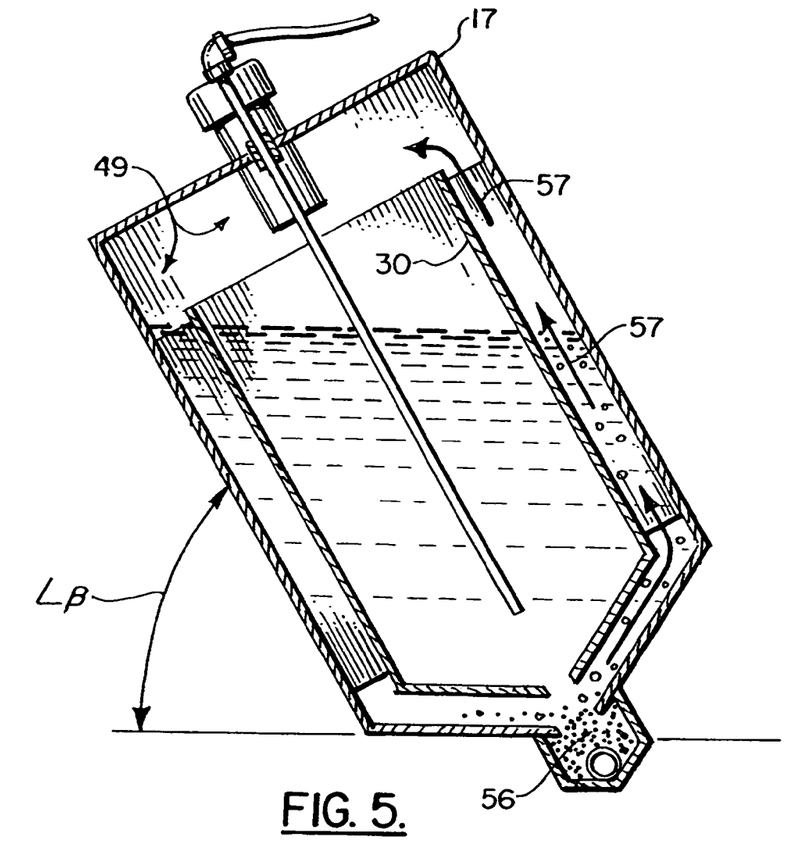
FIG. 5 is an end, sectional view of the preferred embodiment of the apparatus of the present invention.

Any debris, particulate matter, water or the like that trapped in sump 21 can be drained via opening 26 or flushed out using a selected cleaning fluid that is added to opening 41 when plug 42 is removed. A desired cleaning fluid could thus be directed from opening 41 to opening 26 so that any debris, particulate matter, water or undesirable liquid that is contained in sump 21 is discharged as indicated by arrow 29 from sump 21 via opening 26. The debris, particulate matter, undesirable liquid is designated generally by the numeral 56 in FIGS. 4, 5 and 6. In FIGS. 4 and 5, as the tank 10 is tilted an angle of α (alpha) (FIG. 4) or β (beta) (FIG. 5). The air that collects in passageway 50 is channeled upwardly as indicated by arrows 84 in FIGS. 4 and 5.

Figure 7:
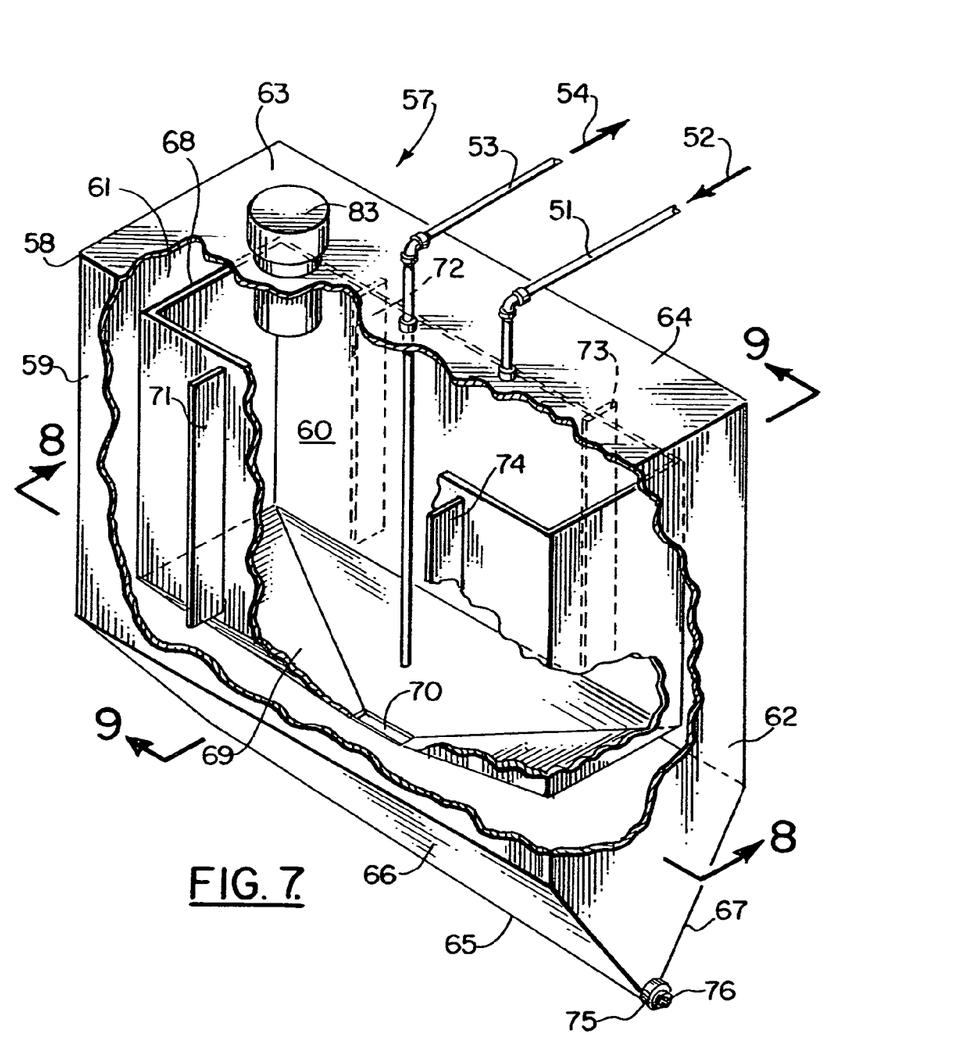
FIG. 7 is a perspective view of an alternate embodiment of the apparatus of the present invention.
Figure 8:
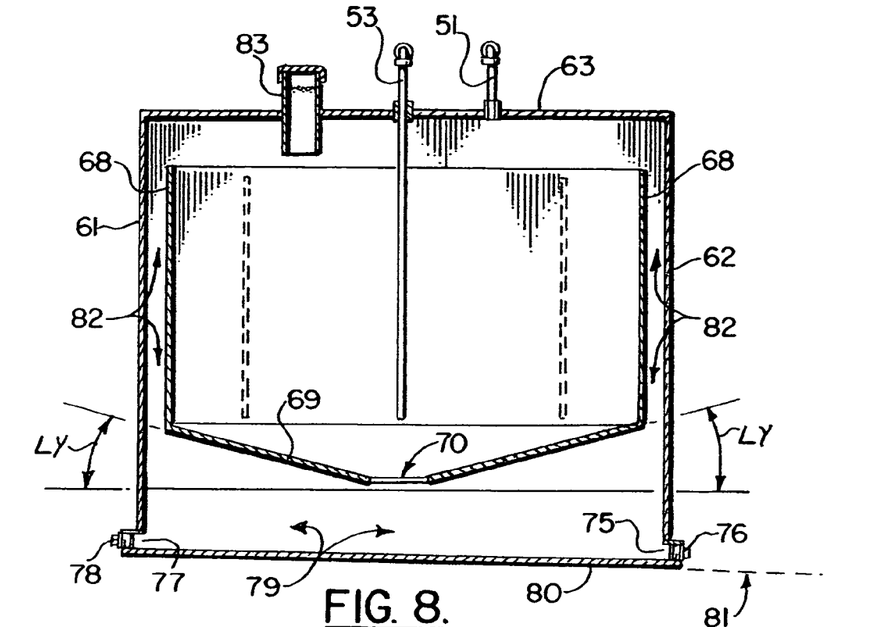
FIG. 8 is a sectional view taken along lines 8-8 of FIG. 7.
Figure 9:
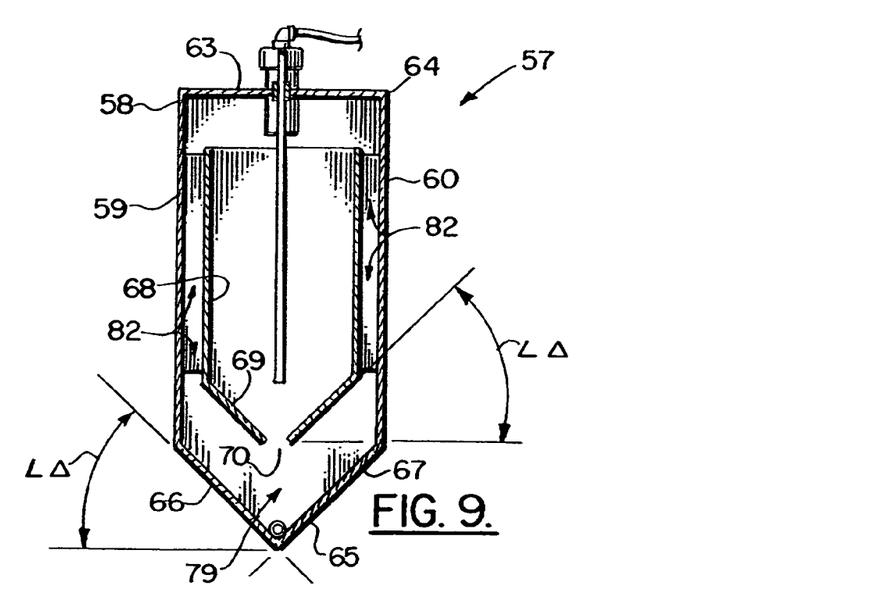
FIG. 9 is a sectional view taken along lines 9-9 of FIG. 7.

An alternate embodiment of the apparatus of the present invention is shown in FIGS. 7-9, designated generally by the numeral 57. Fuel tank 57 provides a tank body 58 having side walls 59, 60, end walls 61, 62 and cover 63. The tank body 58 has an upper end portion 64 and a lower end portion 65. Lower end portion 65 provides two sloped or inclined walls 66, 67 that define a sump 79 as shown best in FIGS. 8 and 9. The interior of tank body 58 is provided with baffle structure 68 that can be attached to a lower most funnel 69 as shown in FIGS. 8 and 9. Funnel 69 has a funnel opening 70 that communicates with sump 79 as shown in FIGS. 8 and 9. Baffle structure 68 can be comprised of a plurality of vertical walls as shown, and being welded or otherwise connected to inclined plates or walls that comprise funnel 69. For example, the entire tank body 58 can be made of welded steel or welded aluminum construction. Baffle structure 68 is supported within tank body 58 using vertical beams 71, 72, 73, 74 as an example. The tank body 58 provides two lower most openings 75, 77. The opening 75 can function as a drain outlet. The opening 77 can function as a clean out or opening for injecting cleaning fluids. For cleaning the tank sump 79, both openings 75, 77 are opened by removing closure plugs 76, 78.

The sump 79 is defined by slope wall 66, 67 that define an inclined trough 80 a tracking reference line 81 as shown in FIG. 8. In this fashion, solid matter that is contained within the fuel inside tank body 58 travels downwardly until it reaches funnel 69. Any solid matter such as debris, dirt, metal parts, etc. travels downwardly along to engage funnel 69 and then flows downwardly through opening 70 to reach sump 79. Because trough 80 is inclined, debris from a dirt, solid matter, or the like that falls through funnel opening 70 reaches trough 79 and sloped walls 66, 67. Because the inclined trough 80 is sloped is indicated by reference line 81 in FIG. 8, solid material, debris, during and the like travels in inclined trough 80 until it reaches a position next to outlet 75.

Any air that is in trained in the fuel that is contained within tank body 58 either travels upwardly if it is contained within the confines of baffles structure 80 and then exits air vent 83, or if it passes through opening 70, it travels upwardly in peripheral channel 82 until it reaches vent 83. In either case, in trained air is separated from the desirable fuel so that it can not be compressed by the pitching and heating of the marine vessel that is holding the tank body 58.

As with the preferred embodiment, flow lines 51, 53 are provided for the intake and discharge of fuel for hollow tank body 58. Arrows 52 and 54 in FIG. 7 demonstrate the direction of flow for fuel that is transmitted to or from the tank body 58.

Figure 10:
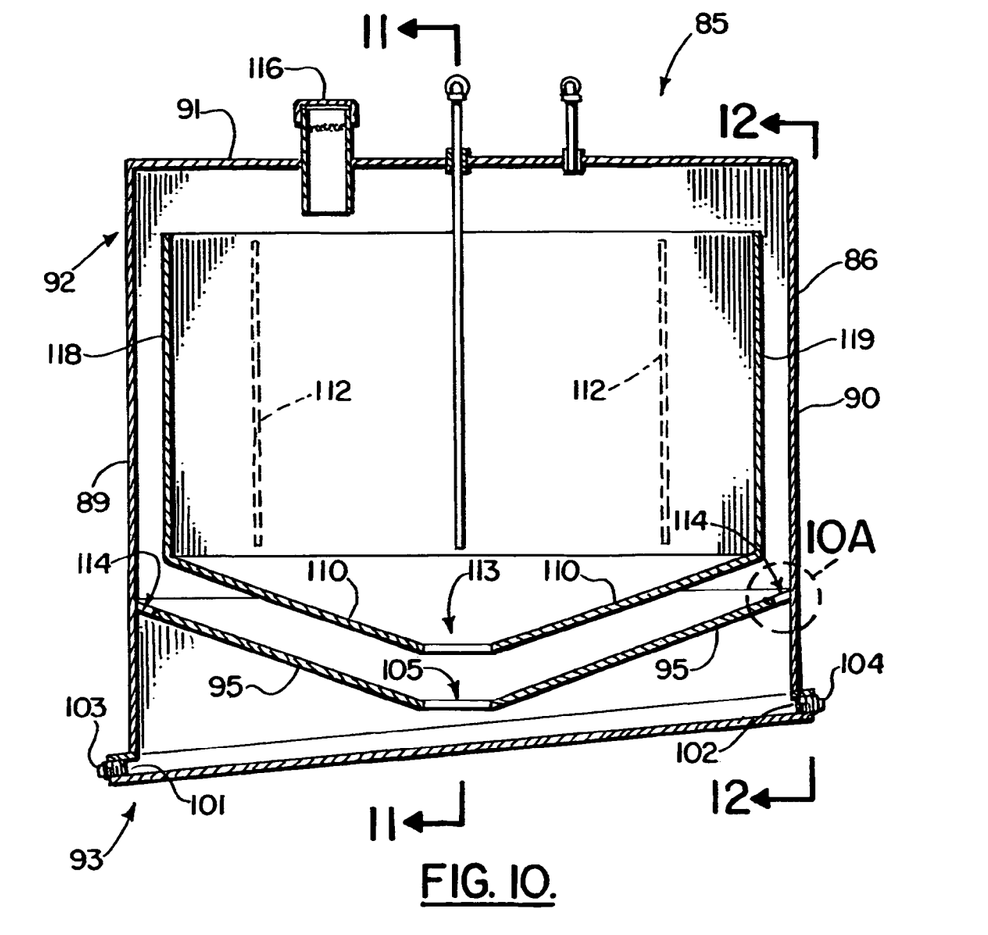
FIG. 10 is a sectional elevation view of another alternate embodiment of the apparatus of the present invention.
Figure 10A:
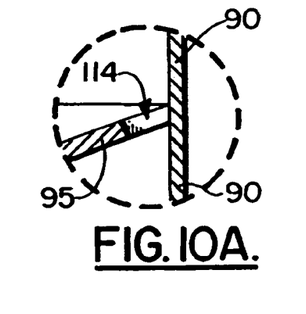
FIG. 10A is a fragmentary view of the alternate embodiment of the apparatus of the present invention showing FIG. 10.
Figure 11:
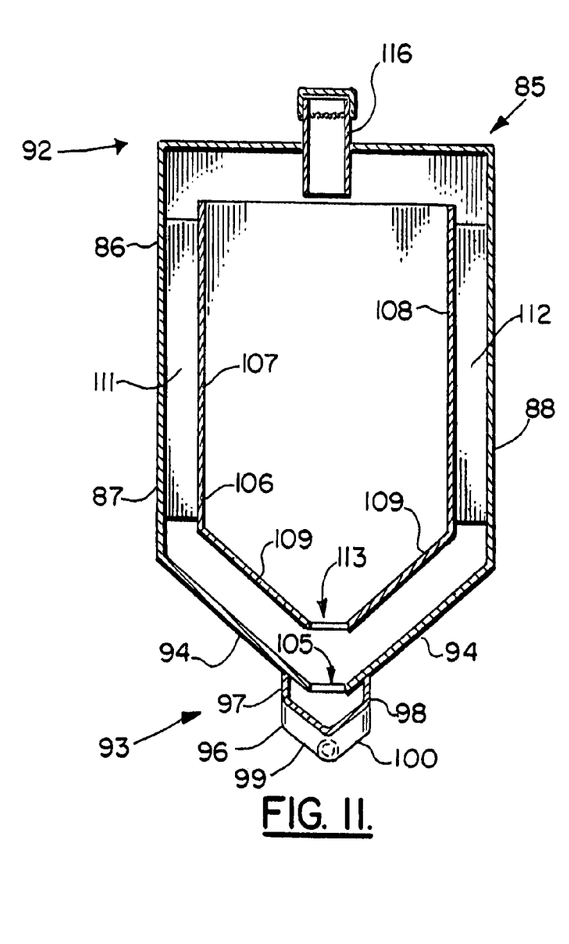
FIG. 11 is a sectional view taken along lines 11-11 of FIG. 10.
Figure 12:
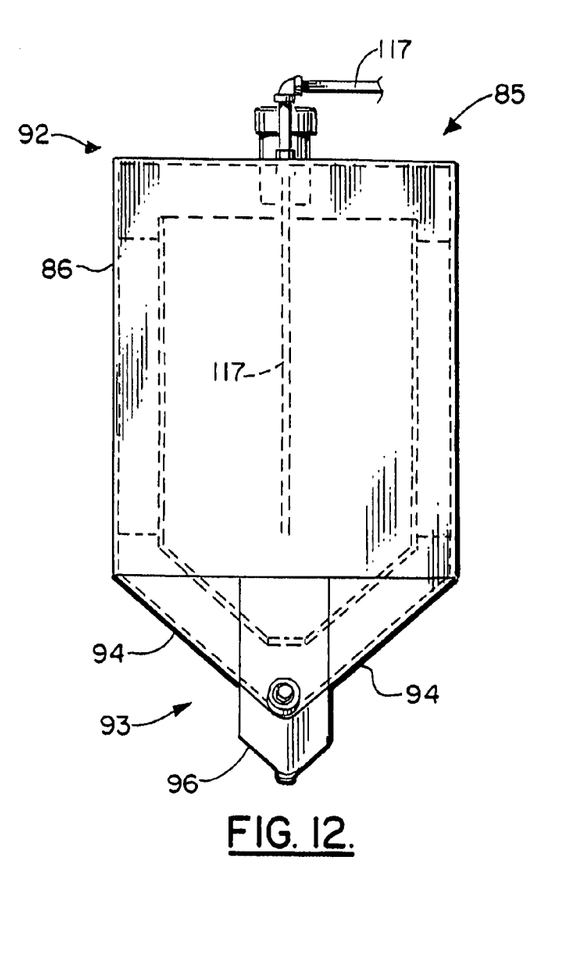
FIG. 12 is an end view taken along lines 12-12 of FIG. 10.

FIGS. 10, 10A and 11-12 show another alternate embodiment of the apparatus of the present invention designated generally by the numeral 85. Fuel tank 85 provides a tank body 86 having side walls 87, 88 and end walls 89, 90. The tank body 86 has a cover 91, upper end portion 92, lower end portion 93. The lower end portion 93 provides a sump 96 defined by inclined side walls 94 and inclined end walls 95. The sump 96 also provides vertical wall sections 97, 98 and inclined wall sections 99, 100 as shown in FIGS. 10-11. A pair of drain openings 101, 102 are provided at opposite ends of sump 96 as shown in FIGS. 10, 11 and 12. Each drain opening 101, 102 can be provided with a closure plug. The opening 101 has plug 103. The opening 102 has plug 104.

Fuel tank 85 of the present invention is designed to collect and entrap debris that might be contained in a fuel product that is inside of the tank body 86. A baffle structure 106 is positioned above a gap 105 that is in between the inclined side walls 94 and in between the inclined end walls 95 as shown in FIGS. 10-12. The baffle structure 106 that is positioned above the gap 105 helps channel any debris or other solid matter within the fuel contained in tank 85 and transmitted via opening 103 to the sump 96, the debris passing through the gap 105 as shown in FIGS. 10 and 11.

The baffle structure can include vertical side wall sections 107, 108 and vertical end wall sections 118, 119. The walls 107, 108, 118, 119 support inclined plates 109, 110 that surround discharge opening 113. The baffle structure 106 is supported with a plurality of supports 111, 112 that can be rectangular plates that are welded to the baffle structure 106 and to the tank body 86 at walls 87, 88 as shown in FIGS. 10-12.

Openings 14 can be provided at the seam that connects inclined walls 94, 95 to walls 87, 88, 89, 90. The plurality of openings 105, 113, 114 enable air to flow upwardly in tank body 86, eventually escaping via vent 116. Solid matter, debris, foreign matter, water or the like falls downwardly in tank body 86, passing through either opening 113 or 105 until it reaches sump 96.

A fuel flow line 117 can be provided for adding fuel to or removing fuel from tank 85 during operation.

All measurements disclosed herein are at standard temperature and pressure, at sea level on Earth, unless indicated otherwise.

The following is a list of parts and materials suitable for use in the present invention.

PARTS LIST

| Parts Number | Description |
| --- | --- |
| 10 | fuel tank |
| 11 | tank body |
| 12 | side wall |
| 13 | side wall |
| 14 | end wall |
| 15 | end wall |
| 16 | cover |
| 17 | upper end portion |
| 18 | lower end portion |
| 19 | inclined side wall |
| 20 | inclined side wall |
| 21 | sump |
| 22 | vertical wall section |
| 23 | vertical wall section |
| 24 | inclined wall section |
| 25 | inclined wall section |
| 26 | drain opening |
| 27 | plug |
| 28 | gap |
| 29 | arrow |
| 30 | baffle structure |
| 31 | side wall |
| 32 | side wall |
| 33 | end wall |
| 34 | end wall |
| 35 | funnel |
| 36 | inclined plate |
| 37 | inclined plate |
| 38 | inclined plate |
| 39 | inclined plate |
| 40 | funnel opening |
| 41 | opening |
| 42 | plug |
| 43 | inclined trough |
| 44 | reference line |
| 45 | vertical beam |
| 46 | vertical beam |
| 47 | vertical beam |
| 48 | vertical beam |
| 49 | interior |
| 50 | peripheral channel |
| 51 | flow line |
| 52 | arrow |
| 53 | flow line |
| 54 | arrow |
| 55 | lower end |
| 56 | undesirable material |
| 57 | fuel tank |
| 58 | hollow tank body |
| 59 | side wall |
| 60 | side wall |
| 61 | end wall |
| 62 | end wall |
| 63 | cover |
| 64 | upper end portion |
| 65 | lower end portion |
| 66 | sloped wall |
| 67 | sloped wall |
| 68 | baffle structure |
| 69 | funnel |
| 70 | funnel opening |
| 71 | vertical beam |
| 72 | vertical beam |
| 73 | vertical beam |
| 74 | vertical beam |
| 75 | drain outlet |
| 76 | plug |
| 77 | opening |
| 78 | plug |
| 79 | sump |
| 80 | inclined trough |
| 81 | reference line |
| 82 | peripheral channel |
| 83 | air vent |
| 84 | arrow |
| 85 | fuel tank |
| 86 | tank body |
| 87 | side wall |
| 88 | side wall |
| 89 | end wall |
| 90 | end wall |
| 91 | cover |
| 92 | upper end portion |
| 93 | lower end portion |
| 94 | inclined side wall |
| 95 | inclined end wall |
| 96 | sump |
| 97 | vertical wall section |
| 98 | vertical wall section |
| 99 | inclined wall section |
| 100 | inclined wall section |
| 101 | drain opening |
| 102 | drain opening |
| 103 | plug |
| 104 | plug |
| 105 | gap |
| 106 | baffle structure |
| 107 | vertical wall section |
| 108 | vertical wall section |
| 109 | inclined wall section |
| 110 | inclined wall section |
| 111 | baffle support |
| 112 | baffle support |
| 113 | opening |
| 114 | opening |
| 115 | opening |
| 116 | vent |
| 117 | flow line |
| 118 | end wall section |
| 119 | end wall section |
| angle $\alpha$ | 5-60, preferably around 30-45 degrees |
| angle $\beta$ | 5-60, preferably around 30-45 degrees |
| angle $\gamma$ | 5-60, preferably around 30-45 degrees |
| angle $\Delta$ | 5-60, preferably around 30-45 degrees |

The foregoing embodiments are presented by way of example only; the scope of the present invention is to be limited only by the following claims.

The invention claimed is:

1. A vehicle and fuel tank apparatus, comprising:
   a) a vehicle that contains or supports a fuel consuming engine and a tank body having a plurality of walls surrounding an interior that enables fuel to be contained, the tank body having upper and lower end portions, outer walls and inner walls, opposed parts of the inner walls forming an obtuse angle;
   b) a fitting for enabling fuel to be added to the tank interior;
   c) a fuel outlet for enabling fuel to be discharged from the tank interior;
   d) a sump at the lower end portion of the fuel tank body below inclined portions of the inner and outer tank walls wherein the inner tank wall has inclined portions that extend in opposed directions away from the sump;
   e) the interior containing a vent flow line that extends from a position above the sump to a position next to the upper end portion of the tank body.

2. The fuel tank apparatus of claim 1 wherein there are a pair of vent flow lines, each positioned to vent gases from the lower end portion of the tank body in one of either a port or a starboard list position of the hull.

3. The marine vessel and fuel tank apparatus of claim 1 wherein there are a pair of said vent flow lines including a port vent flow line and a starboard vent flow line.

4. The marine vessel and fuel tank apparatus of claim 1 wherein there are at least a pair of said vent flow lines in the tank interior.

5. The marine vessel and fuel tank apparatus of claim 1 wherein the tank body has a vertical axis and at least a part of the vent flow line forms an acute angle with the vertical axis.

6. The marine vessel and fuel tank apparatus of claim 2 wherein the tank body has a vertical axis and at least a part of each of the vent flow lines form an acute angle with the vertical axis.

7. The marine vessel and fuel tank apparatus of claim 3 wherein the tank body has a vertical axis and at least a part of each of the vent flow lines form an acute angle with the vertical axis.

8. The marine vessel and fuel tank apparatus of claim 4 wherein the tank body has a vertical axis and at least a part of each of the vent flow lines form an acute angle with the vertical axis.

9. The marine vessel and fuel tank apparatus of claim 1 wherein the vent flow line is positioned next to a wall portion of the tank body.

\* \* \* \* \*